United States Patent
Lin et al.

(10) Patent No.: US 12,228,778 B2
(45) Date of Patent: Feb. 18, 2025

(54) OPTOELECTRONIC PACKAGE

(71) Applicant: Advanced Semiconductor Engineering, Inc., Kaohsiung (TW)

(72) Inventors: Jr-Wei Lin, Kaohsiung (TW); Mei-Ju Lu, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 223 days.

(21) Appl. No.: 17/866,400

(22) Filed: Jul. 15, 2022

(65) Prior Publication Data
US 2024/0019647 A1 Jan. 18, 2024

(51) Int. Cl.
| | |
|---|---|
| *G02B 6/26* | (2006.01) |
| *G02B 6/30* | (2006.01) |
| *G02B 6/42* | (2006.01) |
| *B82Y 20/00* | (2011.01) |
| *G02B 6/10* | (2006.01) |
| *G02B 6/12* | (2006.01) |
| *G02B 6/122* | (2006.01) |
| *G02B 6/36* | (2006.01) |

(52) U.S. Cl.
CPC ........... *G02B 6/4231* (2013.01); *G02B 6/262* (2013.01); *G02B 6/264* (2013.01); *G02B 6/30* (2013.01); *G02B 6/4206* (2013.01); *B82Y 20/00* (2013.01); *G02B 6/107* (2013.01); *G02B 2006/1213* (2013.01); *G02B 6/1225* (2013.01); *G02B 6/3636* (2013.01); *G02B 6/4212* (2013.01)

(58) Field of Classification Search
CPC ...... B82Y 20/00; G02B 6/107; G02B 6/1225; G02B 6/262; G02B 6/264; G02B 6/30; G02B 6/3636; G02B 6/4206; G02B 6/4212; G02B 6/4231; G02B 2006/1213
See application file for complete search history.

(56) References Cited

U.S. PATENT DOCUMENTS

| | | | | |
|---|---|---|---|---|
| 7,068,690 | B2* | 6/2006 | Okazaki | H01S 5/4031 |
| | | | | 372/36 |
| 7,303,339 | B2* | 12/2007 | Zhou | G02B 6/3692 |
| | | | | 385/91 |
| 8,926,198 | B2* | 1/2015 | Park | H04B 10/40 |
| | | | | 385/89 |

(Continued)

FOREIGN PATENT DOCUMENTS

| | | |
|---|---|---|
| CN | 107065082 A | 8/2017 |
| CN | 112965171 A | 6/2021 |

*Primary Examiner* — Ryan A Lepisto
(74) *Attorney, Agent, or Firm* — FOLEY & LARDNER LLP

(57) ABSTRACT

An optoelectronic package is provided. The optoelectronic package includes a photonic component, an optical component, and a connection element. The photonic component includes an optical transmission portion, which includes a plurality of first terminals exposed from a first surface of the photonic component. The optical component faces the first surface of the photonic component. The optical component is configured to transmit optical signals to or receive optical signals from the optical transmission portion. The connection element is disposed between the first surface of the photonic component and the optical component. The connection element is configured to reshape the optical signals.

10 Claims, 17 Drawing Sheets

(56) References Cited

U.S. PATENT DOCUMENTS

| | | | |
|---|---|---|---|
| 9,011,020 B2* | 4/2015 | Ty Tan | G02B 6/30 385/53 |
| 10,720,993 B2* | 7/2020 | Lezec | H04B 10/25137 |
| 10,942,314 B2 | 3/2021 | Horth | |
| 2017/0219783 A1 | 8/2017 | Zhang et al. | |
| 2021/0066893 A1* | 3/2021 | Jang | G01S 17/08 |

* cited by examiner

OPTOELECTRONIC PACKAGE

BACKGROUND

1. Field of the Disclosure

The present disclosure relates to an optoelectronic package, and particularly to an optoelectronic package including a photonic component, an optical component and a connection element configured to reshape optical signals.

2. Description of the Related Art

A silicon-photonics device has advantages of high speed transmission and low power consumption, and thus can be applied in the field of, for example, communication. A silicon-photonics device may include photonic integrated circuit (PIC), electronic integrated circuit (EIC), fiber, and other optical/electronic components. With the rapid growth of the electronics industry, a silicon-photonics device with a greater frequency width and smaller size is required, and the alignment between a PIC and a fiber is becoming much more important.

SUMMARY

In some embodiments, an optoelectronic package includes a photonic component, an optical component, and a connection element. The photonic component includes an optical transmission portion, which includes a plurality of first terminals exposed from a first surface of the photonic component. The optical component faces the first surface of the photonic component. The optical component is configured to transmit optical signals to or receive optical signals from the optical transmission portion. The connection element is disposed between the first surface of the photonic component and the optical component. The connection element is configured to reshape the optical signals.

In some embodiments, an optoelectronic package includes a photonic component, an optical component, and a connection element. The photonic component includes a first terminal exposed from a first surface of the photonic component. The optical component faces the first surface of the photonic component. The optical component includes a second terminal optically coupled to the first terminal. The connection element is configured to enhance an optical coupling efficiency between the first terminal of the photonic component and the second terminal of the optical component.

In some embodiments, an optoelectronic package includes a photonic component, an optical component, and a connection element. The optical component is configured to transmit optical signals and optically coupled with the photonic component. The connection element is located between the photonic component and the optical component. The connection element is configured to generate substantially-collimated light from the optical signals.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
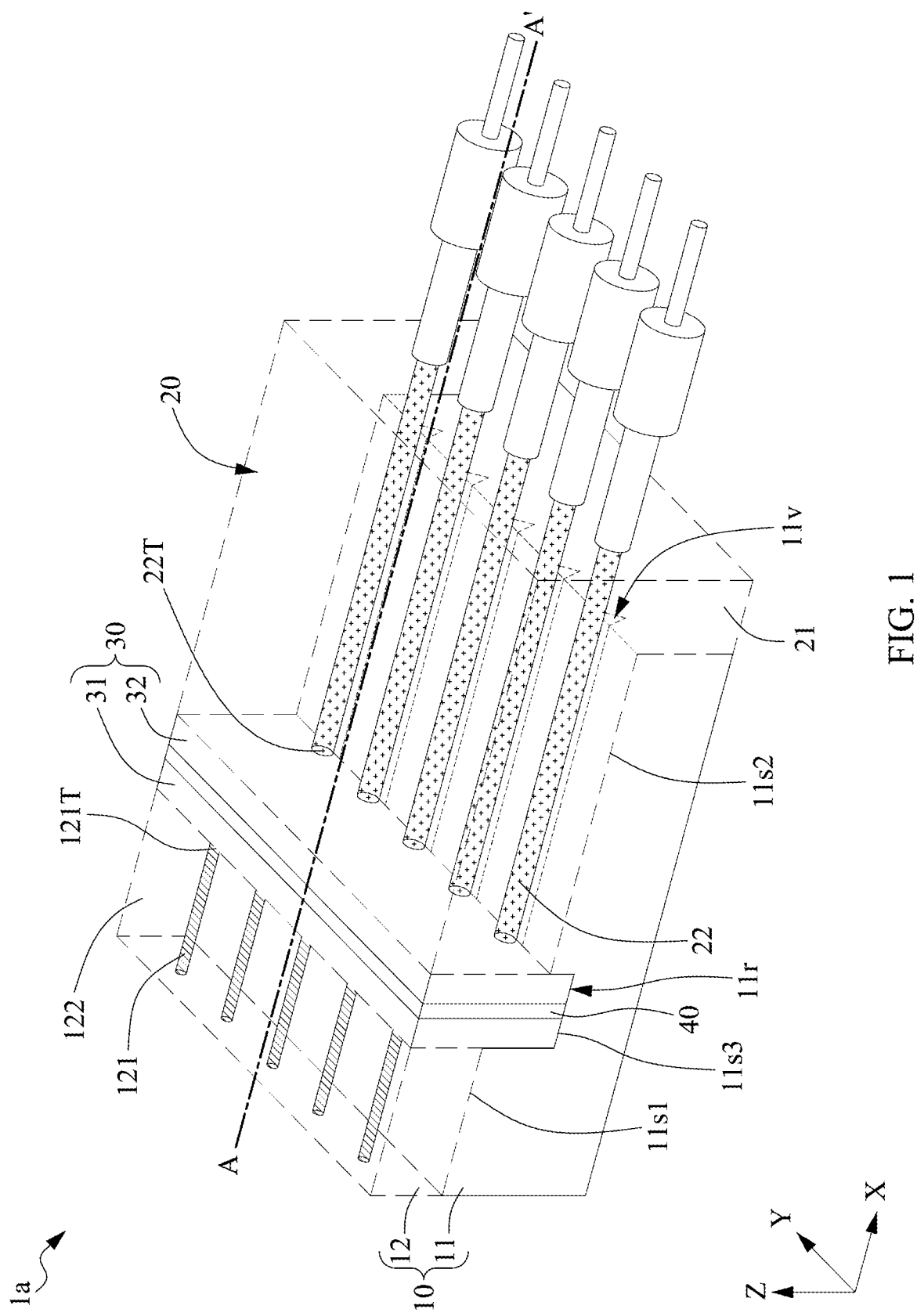
FIG. 1 illustrates a perspective view of an example of an optoelectronic package according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples.

This repetition is for the purpose of simplicity and clarity and does not in itself dictate a relationship between the various embodiments and/or configurations discussed.

As used herein the term "active surface" may refer to a surface of an electronic component or passive element on which contact terminals such as contact pads are disposed. The term "active surface" may also refer to a surface of a photonic component along which a waveguide is disposed, and the waveguide may be disposed adjacent to the active surface.

FIG. 1 illustrates a cross-sectional view of an example of an optoelectronic package 1a according to some embodiments of the present disclosure.

In some embodiments, the optoelectronic package 1a may include a photonic component 10. The photonic component 10 can be configured to process, receive, and/or transmit optical signal(s). The photonic component 10 can convert the optical signal(s) to electric signals or convert the electric signals to optical signal(s). The photonic component 10 can include, but is not limited to, a photonic integrated circuit (PIC).

The photonic component 10 may include a substrate 11 (or carrier) and an optical transmission portion 12. The substrate 11 may include a semiconductor substrate. The substrate 11 may include silicon (Si) or germanium (Ge) in a single crystal form, a polycrystalline form, or an amorphous form. Although not shown in FIG. 1, the substrate 11 may include one or more active elements, passive elements, and conductive traces disposed therein. The active element may include a transistor, diode, or other active elements. The transistor may include bipolar junction transistor, metal-oxide-semiconductor field-effect transistor (MOSFET), junction gate field-effect transistor (JFET) and other transistors. The diode may include Zener diode, photodiode, Schottky diode and other diodes. The passive element may include a capacitor, resistor, inductor or other suitable passive elements. In some embodiments, the substrate 11 may include a surface 11s1, a surface 11s2, and a surface 11s3. In some embodiments, the surfaces 11s1, 11s2 and 11s3 may be referred to as upper surfaces. The surface 11s2 may be at a horizontal level (or elevation) lower than that of the surface 11s1. The surface 11s3 may be at a horizontal level (or elevation) lower than that of the surface 11s2. The surface 11s3 is located between the surface 11s1 and the surface 11s2 may extend between the surfaces 11s1 and 11s2 of the substrate 10 from a top view perspective. In some embodiments, the surface 11s3, a lateral surface (not denoted) connecting the surface 11s1 and 11s3 and a later surface (not denoted) connecting the surface 11s21 and 11s3 may define a recess 11r. The recess 11r may extend along the Y-axis shown in FIG. 1. In some embodiments, the recess 11r may be configured to accommodate a connection element (e.g., 30).

The optical transmission portion 12 may be located on the surface 11s1 of the substrate 11. The optical transmission portion 12 may be configured to receive and transmit optical signal(s) (e.g., light). The optical transmission portion 12 may include a plurality of signal channels 121 for transmitting optical signal(s). The signal channels 121 may be or include a semiconductor material. For example, the signal channels 121 may include or be composed of silicon, silicon nitride, or other suitable materials. In some embodiments, each of the signal channels 121 may be referred to as a waveguide or the plurality of the signal channels 121 may be collectively referred to as a waveguide.

In some embodiments as shown in FIG. 1, the optical transmission portion 12 may include a plurality of signal channels 121 and a cladding layer 122 surrounding the plurality of signal channels 121. The signal channels 121 may be embedded in the cladding layer 122. In some embodiments, an end portion (i.e., terminal 121T) of the signal channels 121 may be exposed from the cladding layer 122. In some embodiments, the terminal 121T of the signal channels is exposed from a lateral surface of the cladding layer 122 (or a lateral surface of the optical transmission portion 12 or a lateral surface of the photonic component 10). In some embodiments, the terminal 121T may be configured to receive or send out an optical signal(s) (e.g., light). In some embodiments, the terminals 121T may be referred to as inputs/outputs (I/Os) of the photonic component 10.

In some other embodiments, the optical transmission portion 12 may include a plurality of signal channels 121 and each of the signal channels 121 is surrounded by a corresponding cladding layer 122.

The cladding layer 122 may include or be composed of oxide, such as silicon oxide ($SiO_2$), yttrium oxide ($Y_2O_3$), aluminum oxide or other suitable materials. The material of the signal channels 121 is different from that of the cladding layer 122. In some embodiments, the refractive index of the material of the signal channels 121 may be greater than that of the cladding layer 122. In some embodiments, the refractive index of the material of the substrate 11 may be greater than that of the cladding layer 122. In some embodiments, the material of the signal channels 121 may be the same as or similar to that of the substrate 11.

In some embodiments, the substrate 11 may define a plurality of grooves 11v. In some embodiments, each of the grooves 11v may be recessed from the surface 11s2 of the substrate 11. In some embodiments, each of the grooves 11v may be connected to the recess 11r. Each of the grooves 11v may extend along the X-axis and may be exposed from the lateral surface of the substrate connecting to the surface 11s3 and the surface 11s2. Each of the grooves 11v may be substantially aligned to a corresponding terminal 121T along the X-axis. In some embodiments, the groove 11v may have a V-shaped profile, a U-shaped profile or other suitable profiles.

In some embodiments, the optoelectronic package 1a may include an optical component 20. In some embodiments, a portion of the optical component 20 may be disposed on or over the surface 11s2 of the substrate 11. In some embodiments, the optical component 20 may be configured to provide an optical signal(s) to the optical transmission portion 12 of the photonic component 10 or to receive an optical signal(s) therefrom.

In some embodiments, the optical component 20 may include a housing 21 and a plurality of signal channels 22 embedded in the housing 21. The housing 21 may be disposed on or over the surface 11s2 of the substrate 11.

In some embodiments, the signal channels 22 may be configured to provide an optical signal(s) to the signal channels 121 of the photonic component 10 or to receive an optical signal(s) therefrom. An end portion (i.e., terminal 22T) of the signal channels 22 may be exposed from the housing 21. In some embodiments, the signal channels 22 may be or include, for example, optical fiber(s). The terminal 22T of the optical component 20 may face the terminal 121T of the photonic component 10. In some embodiments, each of the signal channels 22 may be disposed on or over a corresponding groove 11v such that the terminal 121T of the photonic component 10 may be substantially aligned with the terminal 22T of the optical component 20 along the X-axis. In some embodiments, the signal channels 22 of the optical component 20 may be optically coupled with the optical transmission portion 12 of the photonic component 10. In some embodiments, the dimensions (e.g., diameter or width) of the terminal 22T may be different from the dimensions (e.g., diameter or width) of the terminal 121T. In some embodiments, the dimensions (e.g., diameter or width) of the terminal 22T may be greater than the dimensions (e.g., diameter or width) of the terminal 121T. In some embodiments, the terminals 22T may be referred to as inputs/outputs (I/Os) of the optical component 20.

In some embodiments, the optoelectronic package 1a may include a connection element 30. In some embodiments, the connection element 30 may be disposed between the photonic component 10 and the optical component 20. In some embodiments, the connection element 30 may be disposed between the terminals 121T of the photonic component 10 and the terminals 22T of the optical component 20. In some embodiments, the connection element 30 may be at least partially disposed in the recess 11r of the substrate 11. In some embodiments, the connection element 30 may be configured to optically align the terminals 121T of the photonic component 10 and the terminals 22T of the optical component 20. In some embodiments, the connection element 30 may be configured to reshape optical signal(s) (not shown in FIG. 1) transmitted between the photonic component 10 and the optical component 20. For example, the connection element 30 may adjust a light radius of an optical signal; the connection element 30 may modify a path of an optical signal. In some embodiments, the connection element 30 may be configured to switch a divergent light to a substantially-collimated light. In some embodiments, the connection element 30 may be configured to switch a divergent beam or a divergent beam of light to a substantially-collimated beam or a substantially-collimated beam of light. In some embodiments, the connection element 30 may be configured to switch a substantially-collimated light to a convergent light. In some embodiments, the connection element 30 may be configured to switch a substantially-collimated beam or a substantially-collimated beam of light to a convergent beam or a convergent beam of light. In some embodiments, the connection element 30 may be configured to switch a convergent light to a divergent light. In some embodiments, the connection element 30 may be configured to switch a convergent beam or a convergent beam of light to a divergent beam or a divergent beam of light. In some embodiments, the connection element 30 may be configured to switch a divergent light to a convergent light. In some embodiments, the connection element 30 may be configured to switch a divergent beam or a divergent beam of light to a convergent beam or a convergent beam of light.

In some embodiments, the connection element 30 may include a structure portion 31 and a structure portion 32 spaced apart from the structure portion 31. In some embodiments, the structure portion 31 may be disposed adjacent to the photonic component 10. In some embodiments, the structure portion 31 may cover the terminals 121T of the photonic component In some embodiments, the structure portion 32 may be disposed adjacent to the optical component 20. In some embodiments, the structure portion 32 may cover the terminals 22T of the optical component 20. Each of the structure portions 31 and 32 may be configured to reshape an optical signal(s).

In some embodiments, the optoelectronic package 1a may include an optical adhesive In some embodiments, the optical adhesive 40 may be disposed between the structure portions 31 and 32. The optical adhesive 40 may be configured to attach the structure portion 31 to the structure portion 32. The optical adhesive 40 may be optically transparent. In some embodiments, the optical adhesive 40 may include an optical clear adhesive (OCA) or other suitable materials.

Figure 2A:
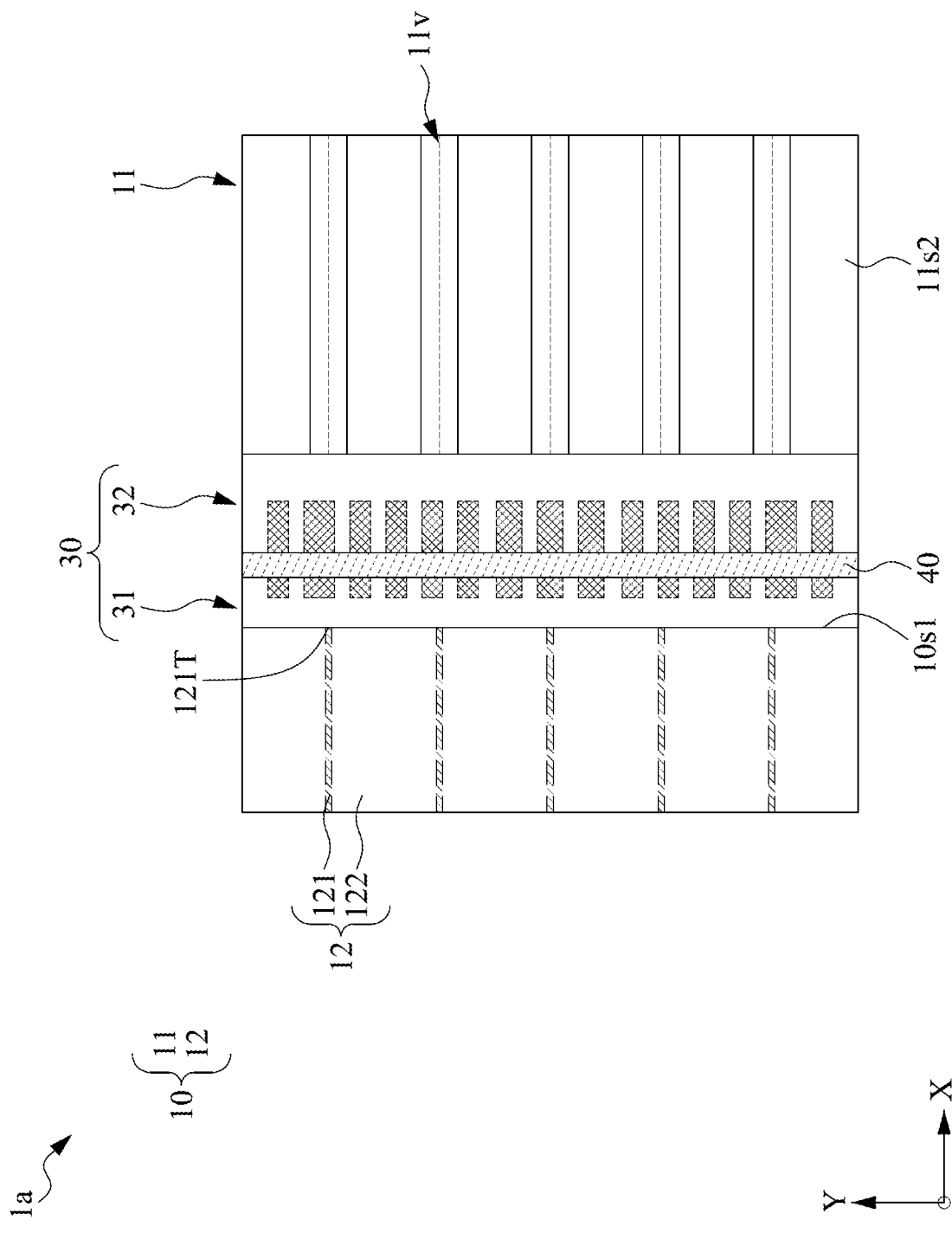
FIG. 2A illustrates a top view of the optoelectronic package as shown in FIG. 1.

FIG. 2A illustrates a top view of the optoelectronic package 1a as shown in FIG. 1. It should be noted that some features (e.g., the optical component 20) are omitted in FIG. 2A for brevity.

The photonic component 10 may have a surface 10s1 (or a lateral surface). The surface may face the connection element 30. The surface 10s1 may be substantially perpendicular to the surface 11s2 of the substrate 11. Each of the terminals 121T may be exposed from the surface of the photonic component 10.

In some embodiments, the connection element 30 may be free from overlapping the groove 11v of the substrate 11 along the Z-axis. In some embodiments, the structure portion 31 of the connection element 30 may be free from overlapping the groove 11v of the substrate 11 along the Z-axis. In some embodiments, the structure portion 32 of the connection element 30 may be free from overlapping the groove 11v of the substrate 11 along the Z-axis. Each of the grooves 11v may extend between the connection element 30 and a lateral surface (not annotated in the figures) of the substrate 11 along the X-axis. In other embodiments, the connection element 30 may partially overlap the groove 11v of the substrate 11 along the Z-axis.

Figure 2B:
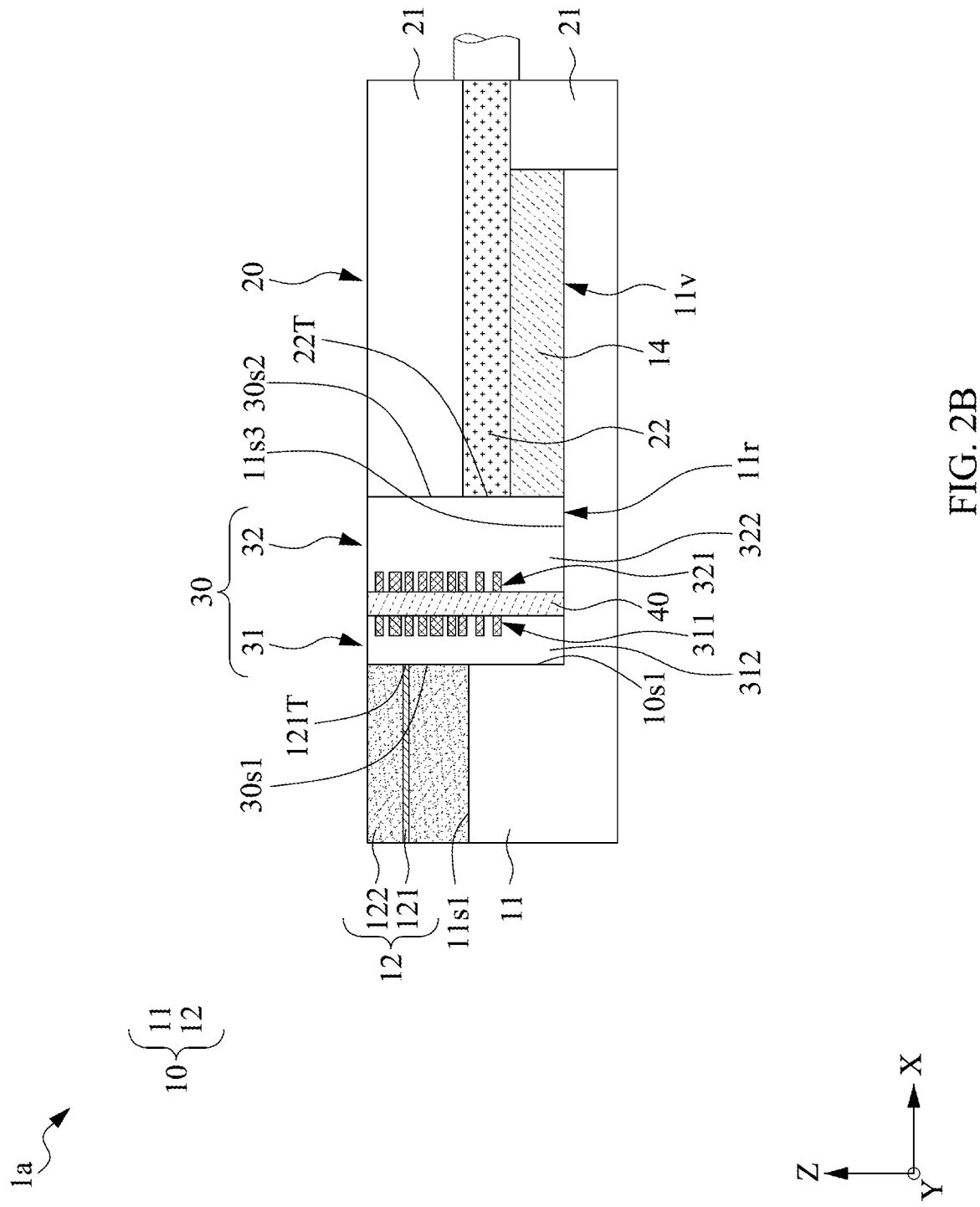
FIG. 2B illustrates a cross-sectional view along line A-A' of the optoelectronic package as shown in FIG. 1.

FIG. 2B illustrates a cross-sectional view along line A-A' of the optoelectronic package 1a as shown in FIG. 1.

In some embodiments, the optoelectronic package 1a may include a glue layer 14. In some embodiments, the glue layer 14 may fill the grooves 11v of the substrate 11. In some embodiments, the signal channels 22 may be disposed on or over the glue layer 14 and attached to the grooves 11v through the glue layer 14. The optical component 20 may be attached to the substrate 11 through the glue layer 14. In some embodiments, a lower surface (not annotated in the figures) of the signal channels 22 may be exposed from or not covered by the housing 21 and to be in contact with the glue layer 14.

In some embodiments, the connection element 30 may have a surface 30s1 (or a side) facing the photonic component 10 and a surface 30s2 (or a side) facing the optical component 20. In some embodiments, the structure portion 31 may include a microstructure 311. In some embodiments, the structure portion 31 may include a microstructure 311 with micro-size features or patterns. In some embodiments, the structure portion 31 may include a microstructure 311 with nano-size features or patterns (which can be also referred to as "nanostructure"). In some embodiments, the structure portion 31 may include a metasurface structure. In some embodiments, the structure portion 31 may include a nanostructure 311 and a medium layer 312. The nanostructure 311 may be recessed from or protrude from a surface of the medium layer 312. In some embodiments, the nanostructure 311 may be aligned with or overlap the terminals 121 of the photonic component 10 along the X-axis. The nanostructure 311 may be configured to reshape an optical signal(s) (e.g., light). For example, when light passes through, enters, or comes out of the nanostructure 311, a light radius of the light may be modified. In some embodiments, the nanostructure 311 may be configured to switch a divergent light to a substantially-collimated light. In some embodiments, the nanostructure 311 may be configured to switch a divergent beam or a divergent beam of light to a substantially-collimated beam of light. In some embodiments, the nanostructure 311 may be configured to switch a substantially-collimated light to a divergent light. In some embodiments, the nanostructure 311 may be configured to switch a substantially-collimated beam or a substantially-collimated beam of light to a divergent beam or a divergent beam of light. In some embodiments, the nanostructure 311 may be configured to switch a substantially-collimated light to a convergent light. In some embodiments, the nanostructure 311 may be configured to switch a substantially-collimated beam or a substantially-collimated beam of light to a convergent beam or a convergent beam of light. In some embodiments, the nanostructure 311 may be configured to switch a convergent light to a substantially-collimated light. In some embodiments, the nanostructure 311 may be configured to switch a convergent beam or a convergent beam of light to a substantially-collimated beam or a substantially-collimated beam of light.

In some embodiments, the structure portion 32 may include a microstructure 321. In some embodiments, the structure portion 32 may include a microstructure 321 with micro-size features or patterns. In some embodiments, the structure portion 31 may include a microstructure 321 with nano-size features or patterns (which can be also referred to as "nanostructure"). In some embodiments, the structure portion 32 may include a metasurface structure. In some embodiments, the structure portion 32 may include a nanostructure 321 and a medium layer 322. The nanostructure 321 may be recessed from or protrude from a surface of the medium layer 322. In some embodiments, the nanostructure 321 may be at least partially aligned with or overlap the terminal 22T of the optical component 20 along the X-axis. In some embodiments, the nanostructure 321 may be at least partially aligned with the nanostructure 311 along the X-axis. The nanostructure 321 may be configured to reshape an optical signal(s) (e.g., light). For example, when light passes through, enters, or comes out of the nanostructure 321, a light radius of the light may be modified. In some embodiments, the nanostructure 321 may be configured to switch a divergent light to a substantially-collimated light. In some embodiments, the nanostructure 321 may be configured to switch a divergent beam or a divergent beam of light to a substantially-collimated beam or a substantially-collimated beam of light. In some embodiments, the nanostructure 321 may be configured to switch a substantially-collimated light to a divergent light. In some embodiments, the nanostructure 321 may be configured to switch a substantially-collimated beam or a substantially-collimated beam of light to a divergent beam or a divergent beam of light. In some embodiments, the nanostructure 321 may be configured to switch a substantially-collimated light to a convergent light. In some embodiments, the nanostructure 321 may be configured to switch a substantially-collimated beam or a substantially-collimated beam of light to a convergent beam or a convergent beam of light. In some embodiments, the nanostructure 321 may be configured to switch a convergent light to a substantially-collimated light. In some embodiments, the nanostructure 321 may be configured to switch a convergent beam or a convergent beam of light to a substantially-collimated beam or a substantially-collimated beam of light.

In some embodiments, the structure portions 31 and 32 may collectively be configured to generate a substantially-collimated light (or a substantially-collimated beam or a substantially-collimated beam of light) transmitted between the structure portions 31 and 32, which will be discussed later. In some embodiments, the nanostructures 311 and 321 may collectively be configured to generate a substantially-collimated light (or a substantially-collimated beam or a substantially-collimated beam of light) transmitted between the structure portions 31 and 32, which will be discussed later.

In some embodiments, the terminals 121T of the optical transmission portion 12 and the terminals 22T of the optical component 20 may be located at different horizontal levels. In this embodiment, the connection element 30 may be configured to optically align the terminals 121T of the optical transmission portion 12 and the terminals 22T of the optical component 20. For example, when an optical signal (s) is emitted from the optical component 20, the optical signal may be transmitted to the terminal 121T of the optical transmission portion 12 through the connection element 30, which reshapes the optical signal and adjusts the light radius of the optical signal(s).

Although FIG. 2B illustrates that the surface 10s1 of the photonic component 10 is a smooth surface, it should be noted that the surface 10s1 of the photonic component 10 may have different roughness at different portions after processing (for example, laser blading, etching) when these portions are made of different materials. For example, the surface 10s1 constituted by the substrate 11 may have a relatively great roughness due to manufacturing processes.

Figure 3A:
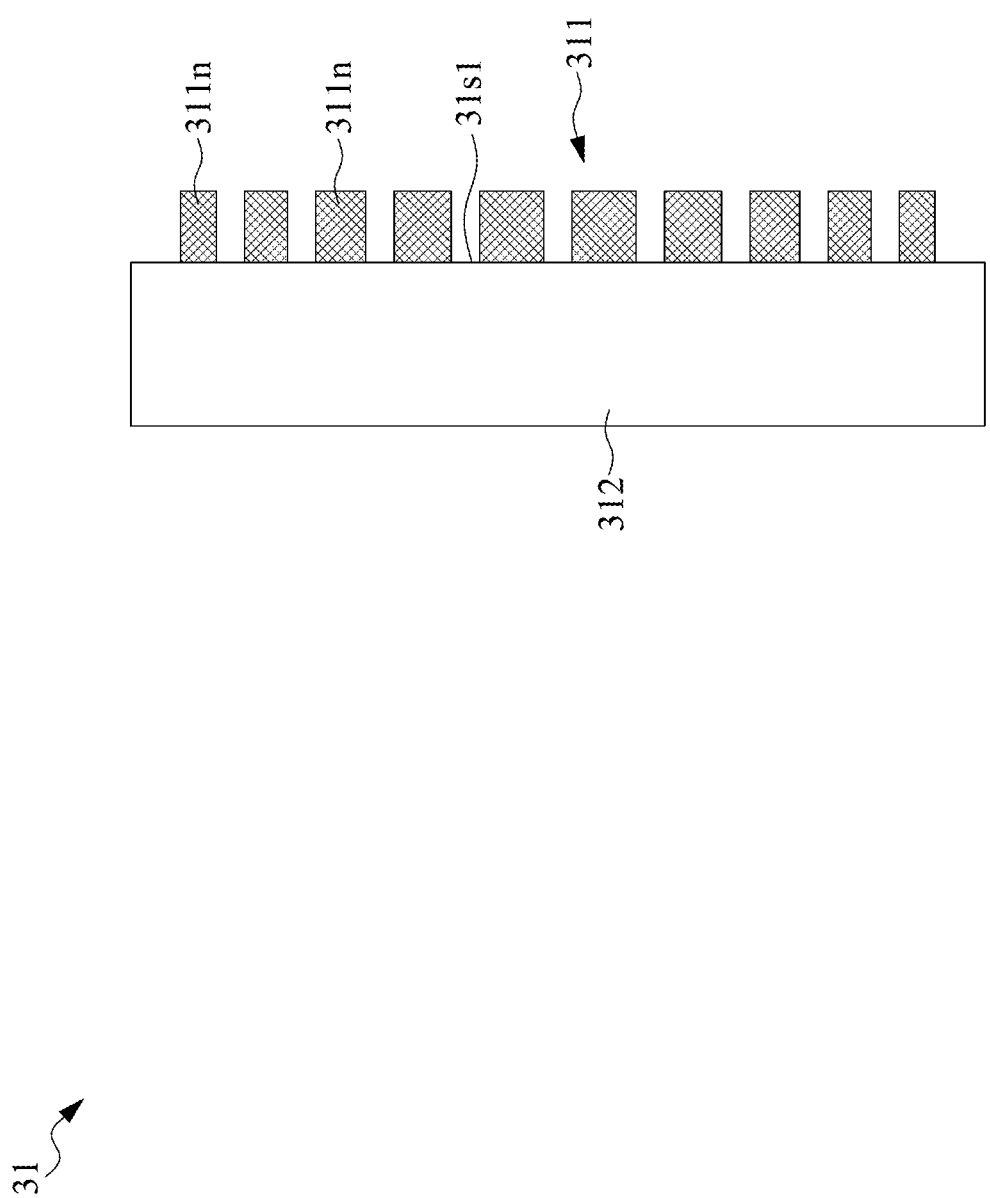
FIG. 3A illustrates a cross-sectional view of an example of a nanostructure according to some embodiments of the present disclosure.
Figure 3B:
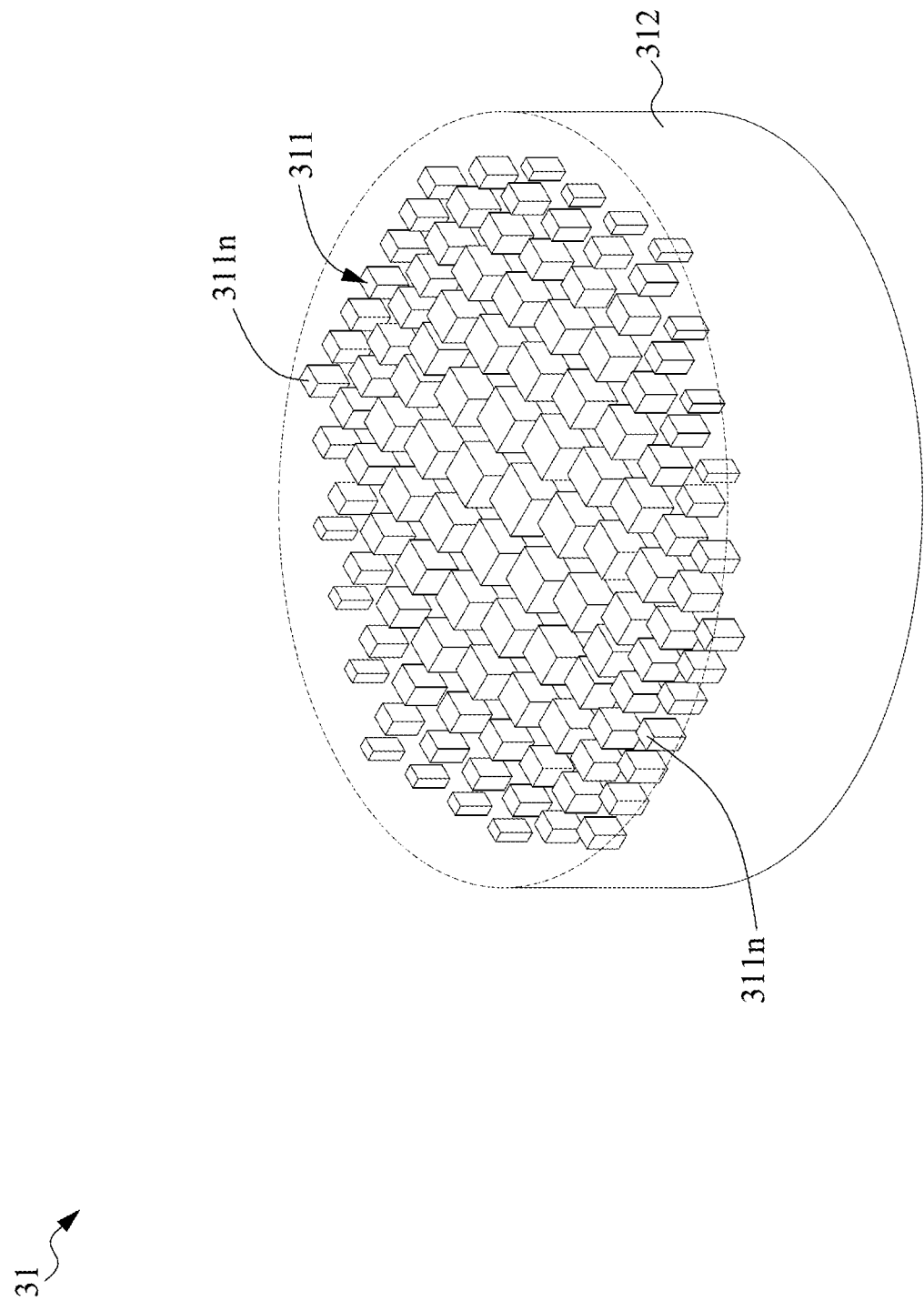
FIG. 3B illustrates a perspective view of a part of a connection element according to some embodiments of the present disclosure.

With reference to FIG. 3A and FIG. 3B, FIG. 3A illustrates a cross-sectional view of the structure portion 31, and FIG. 3B illustrates a perspective view of the structure portion 31. Although the structure portion 32 is not illustrated, it should be noted that the structure portion 32 may be designed in a similar way.

As shown in FIG. 3A and FIG. 3B, the structure portion 31 may have a structure surface 31s1, which may face the structure portion 32 (not shown in FIG. 3A). The nanostructure 311 may be disposed at the structure surface 31s1. In some embodiments, the nanostructure 311 may include or be composed of a plurality of nano-pillars 311n of different dimensions (e.g., diameter, width, or surface area). The nano-pillars 311n may be disposed at the structure surface 31s1. The nano-pillars 311n may protrude from the structure surface 31s1. In some embodiments, a nano-film may be deposited on an external surface of the medium layer 312, and the nano-film may be etched to form a plurality of nano-pillars 311n. The nano-pillars 311n may be disposed on and/or partially embedded in the medium layer 312. In some embodiments, the nano-pillars 311n may have different dimensions. The dimensions of the nano-pillars 311n may depend on the light radius received by or transmitted from the terminal 121T of the optical transmission portion 12. For example, an arrangement of features of the nanostructure 311 (or nano-pillars 311n) may match a wavelength of the optical signal(s). In some embodiments, the nanostructure 311 may include or be made of titanium oxide or other suitable materials. In some embodiments, the medium layer 312 may include or be made of silicon oxide or other suitable materials. In some embodiments, the inner portion of the nano-pillars 311n may have dimensions greater than those of the outer portion of the nano-pillars 311n. In some embodiments, the pitch of the inner portion of the nano-pillars 311n may be equal to that of the outer portion of the nano-pillars 311n. In some embodiments, the space between the inner portion of the nano-pillars 311n may be less than that of the outer portion of the nano-pillars 311n.

Figure 3C:
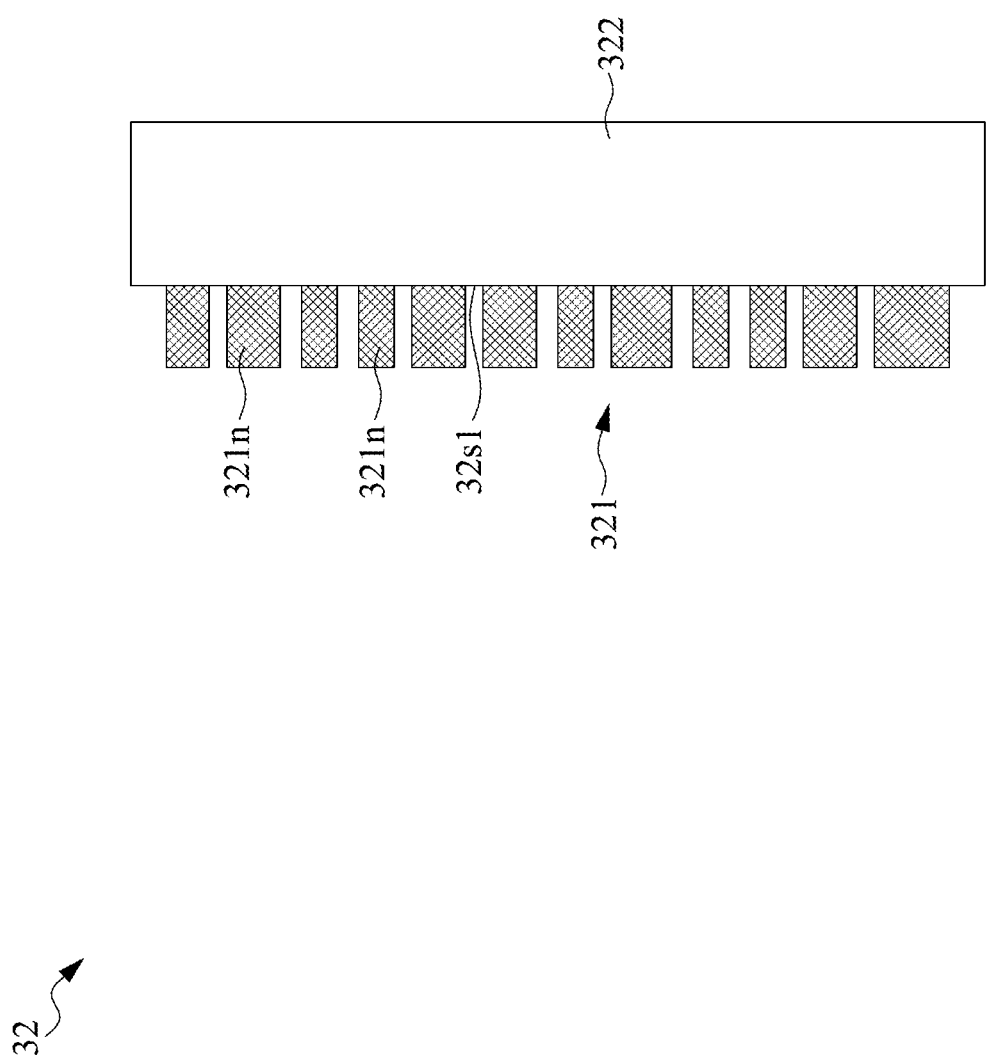
FIG. 3C illustrates a cross-sectional view of an example of a nanostructure according to some embodiments of the present disclosure.

Similarly, as shown in FIG. 3C, the structure portion 32 may have a structure surface 32s1 facing the structure surface 31s1. The nanostructure 321 may be disposed at the structure surface 32s1 of the structure portion 32. The nano-pillars 321n may protrude from the structure surface 32s1. The nanostructure 321 may include a plurality of nano-pillars 321n of different dimensions (e.g., diameter, width, or surface area). The dimensions of the nano-pillars of the nanostructure 321 may depend on the light radius received by or transmitted from the terminal 22T of the optical component 20.

In some embodiments, the dimensions of the nano-pillars (e.g., 311n) of the nanostructure 311 may be different from the dimensions of the nano-pillars (e.g., 321n) of the nanostructure 321. In some embodiments, the width of the nano-pillars (e.g., 311n) of the nanostructure 311 may be different from the width of the nano-pillars (e.g., 321n) of the nanostructure 321. In some embodiments, the average width of the nano-pillars (e.g., 311n) of the nanostructure 311 may be different from the average width of the nano-pillars (e.g., 321n) of the nanostructure 321 to facilitate optical alignment of the terminal 22T of the optical component 20 and the terminal 121T of the photonic component 10. For example, the dimensions of the nano-pillars (e.g., 311n) of the nanostructure 311 may be less than those of the nano-pillars (e.g., 321n) of the nanostructure 321. For example, the ratio between the dimension of the nano-pillars 321n and the nano-pillars 311n may range from about 2 to about 50, such as 2, 5, 10, 20, 30, 40, or 50.

Figure 3D:
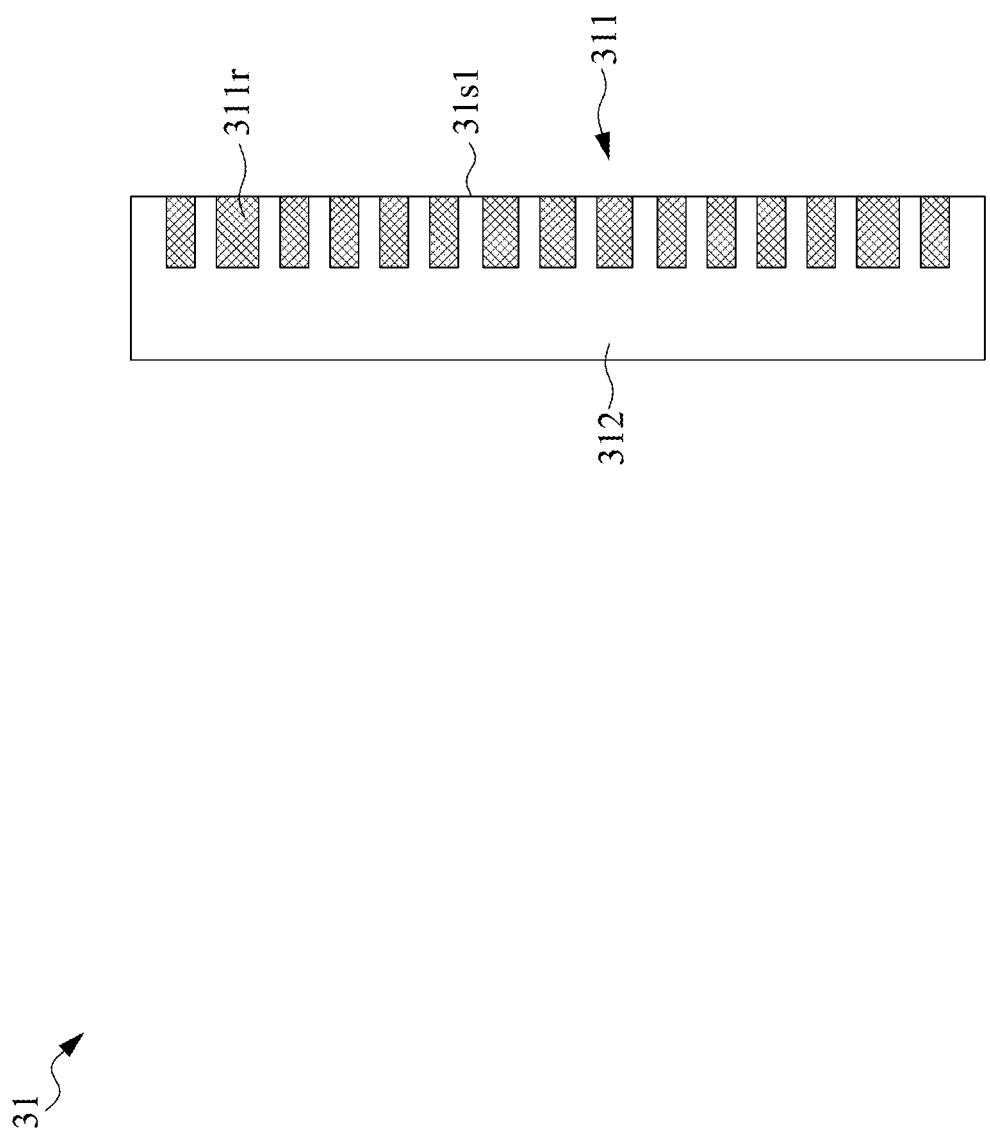
FIG. 3D illustrates a cross-sectional view of an example of a nanostructure according to some embodiments of the present disclosure.

In some embodiments, the nano-pillars of the structure portion 31 and/or structure portion 32 may be replaced by nano-trenches. As shown in FIG. 3D, the structure portion 31 may include a plurality of nano-trenches 311r. Each of the nano-trenches 311r may be recessed from an external surface of the medium layer (e.g., 311). Similarly, the structure portion 32 may include a plurality of nano-trenches (not shown). Each of the nano-trenches may be recessed from an external surface of the medium layer (e.g., 322). Each of the nano-trenches may be filled with, for example, titanium oxide or other suitable materials. In some embodiments, the medium layer 312 may be etched to from a plurality of recesses, and fillers, such as titanium oxide, may be filled into the recesses to form a plurality of nano-trenches 311r.

In a comparative optoelectronic package, optical signal(s) is transmitted between a photonic component and an optical component without passing through a connection element. In some situations, the terminal of the photonic component is misaligned to the terminal of the optical component, which may increase the signal loss and thus adversely affect the performance of the optoelectronic package. Further, in a comparative example, when the terminal of a photonic component is misaligned with a terminal of the optical component, the location (or angle) of the terminal of the photonic component and/or the optical component should be tuned along the X, Y, and/or Z-axis, which may adversely affect mass production. In embodiments of the present disclosure, a connection element (e.g., 30) is utilized to reshape an optical signal(s) transmitted between an optical component (e.g., 20) and a photonic component (e.g., 10). The connection element 30 includes a dual-microstructure, the first microstructure of the connection element 30 can enlarge the light radius of the light coming from the optical component (or the photonic component), and the enlarged light is transmitted to the second micro-structure, switched to a convergent light through the second micro-structure and then transmitted to the signal channels of the photonic component (or optical component). As a result, the misalignment issue can be greatly improved and it is unnecessary to strictly control the alignment of the terminals of the optical component with the terminals of the photonic component. The connection element may facilitate optical coupling between the optical component and the photonic component even when the terminals thereof are misaligned. Further, the connection element may adjust the light radius and generate a substantially-collimated light. Therefore, even when the terminal of the optical component and the terminal of the photonic component have different dimensions (e.g., radius, width and/or surface area), the signal loss may be reduced. Moreover, optical coupling efficiency of optoelectronic package 1a may increase at least by 10%, 20%, 30% or more, and for example, up to 70%, 80%, 90% or 100%, in comparison with a comparative optoelectronic package.

Figure 4:
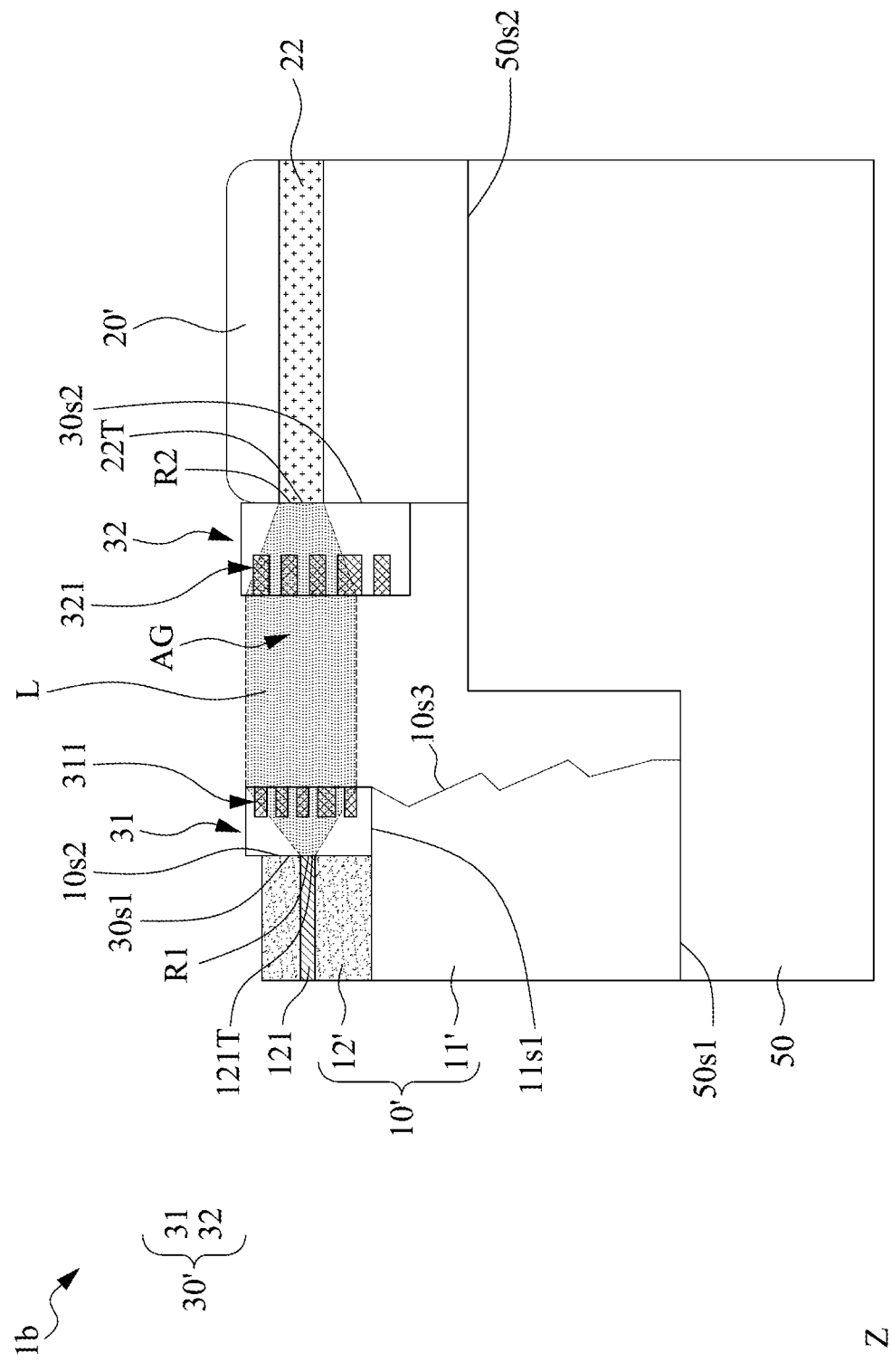
FIG. 4 illustrates a cross-sectional view of an example of an optoelectronic package according to some embodiments of the present disclosure.

FIG. 4 illustrates a cross-sectional view of an example of an optoelectronic package 1b according to some embodiments of the present disclosure. The optoelectronic package 1b is similar to the optoelectronic package 1a as shown in FIG. 2B, and the differences therebetween are described below.

In some embodiments, the optoelectronic package 1b may include a photonic component 10'. In some embodiments, the photonic component 10' may include a substrate 11' and an optical transmission portion 12'. The optical transmission portion 12' may be disposed on or over the surface 11s1 of the substrate 11'. In some embodiments, a portion of the surface 11s1 of the substrate 11' may be exposed from the optical transmission portion 12'. The optical transmission portion 12' of the photonic component 10' may have a surface 10s2. The substrate 11' of the photonic component 10' may have a surface 10s3 noncoplanar with the surface 10s2. The surface 10s2 of the photonic component 10' may function as a light coupling region. An end portion (i.e., terminal) of the signal channel 121 may be exposed from the surface 10s2. The surface 10s3 of the photonic component 10' may function as a non-light coupling region. In some embodiments, the light coupling region may be defined as a region configured to be coupled with an optical component (e.g., 20') so as to receive an optical signal(s) from the optical component or transmit an optical signal(s) to the optical component. The non-light coupling region may be defined as a region which is not configured to be coupled with an optical component (e.g., 20'). In some embodiments, the surfaces 10s2 and the 10s3 of the photonic component 10' may have different roughness. In some embodiments, the roughness of the surface 10s3 of the photonic component may be greater than the roughness of the surface 10s2 of the photonic component 10' due to manufacturing processes, such as saw cutting, etching, or other suitable processes.

In some embodiments, the optoelectronic package 1b may include an optical component 20'. In some embodiments, the optical component 20' may include at least one signal channel 22. In some embodiments, the optical component 20' may not be disposed on or over a groove formed on a photonic component.

In some embodiments, the optoelectronic package 1b may include a connection element 30'. In some embodiments, the structure portion 31 and the structure portion 32 of the connection element 30' may be separated. In some embodiments, an air gap (AG) may be located between the structure portions 31 and the 32 of the connection element 30'. In some embodiments, the structure portion 31 of the connection element 30' may be in contact with the surface 11s1 of the substrate 11'. In some embodiments, the structure portion 32 of the connection element 30' may be free from overlapping the substrate 11'. Although FIG. 4 illustrates that an upper surface (not annotated in FIG. 4) of the structure portion 31 is higher than an upper surface (not annotated in FIG. 4) of the optical transmission portion 12', the upper surface of the structure portion 31 may be lower than the upper surface of the optical transmission portion 12' or at substantially the same horizontal level in other embodiments. In some embodiments, the surface area of the surface 30s1 of the connection element 30' may be greater than the surface area of the surface 10s2 of the photonic component 10', which may enhance the coupling efficiency when the terminal 121T receives optical signals from the optical component 20'.

In some embodiments, the optoelectronic package 1b may include a supportive substrate 50 (or a carrier). The supportive substrate 50 may be configured to support the photonic component 10' and/or the optical component 20'. The supportive substrate 50 may include an organic substrate (e.g., prepreg (PP), Ajinomoto build-up film (ABF) or other suitable material), a semiconductor substrate (e.g., silicon (Si), germanium (Ge) or other suitable material) or other suitable materials. The supportive substrate 50 may include active elements, passive elements and conductive traces embedded therein. In some embodiments, the supportive substrate 50 may include an interposer, a fan-out substrate, a package structure or other suitable structures. In some embodiments, the supportive substrate 50 may include a surface 50s1 and a surface 50s2. In some embodiments, the surface 50s1 and a surface 50s2 may be referred to as upper surfaces. The surface may have a horizontal level different from that of the surface 50s2. The photonic component may be disposed on or over the surface 50s1 of the supportive substrate 50. The optical component 20' may be disposed on or over the surface 50s2 of the supportive substrate 50.

As shown in FIG. 4, an optical signal L may be transmitted from the optical component to the photonic component 10' or transmitted from the photonic component 10' to the optical component 20'. The optical signal L may have a light radius R1 when the optical signal L enters or exists from the terminal 121T of the photonic component 10'. The optical signal L may have a light radius R2 when the optical signal L enters or exists from the terminal 22T of the optical component 20'. In some embodiments, the light radius R1 may be different from the light radius R2. For example, the light radius R1 may be less than the light radius R2.

In some embodiments, the optical component 20' may provide the photonic component with the optical signal L. The optical component 20' may provide a divergent light (or a divergent beam or a divergent beam of light). The embodiments where the optical component 20' provides a divergent light are used as an example for illustration. When the divergent light enters, passes, and then comes out of the structure portion 32 (or nanostructure 321), the divergent light may be switched to a substantially-collimated light. The substantially-collimated light may be transmitted between the structure portion 32 (or nanostructure 321) and the structure portion 31 (or nanostructure 311). When the substantially-collimated light enters, passes, and then comes out of the structure portion 31 (or nanostructure 311), the substantially-collimated light may be switched to a convergent light, and then received by the terminal 121T of the photonic component 10'. In these embodiments, the optical signal L may include a divergent, a substantially-collimated, and a convergent light along its travel path.

In this embodiment, the optical signal L can be transmitted between the photonic component 10' and the optical component 20' even when the terminal 121T of the photonic component 10' and the terminal 22T of the optical component 20' are misaligned and/or have different dimensions, which thereby reduces a signal loss of the optical package 1b.

Figure 5:
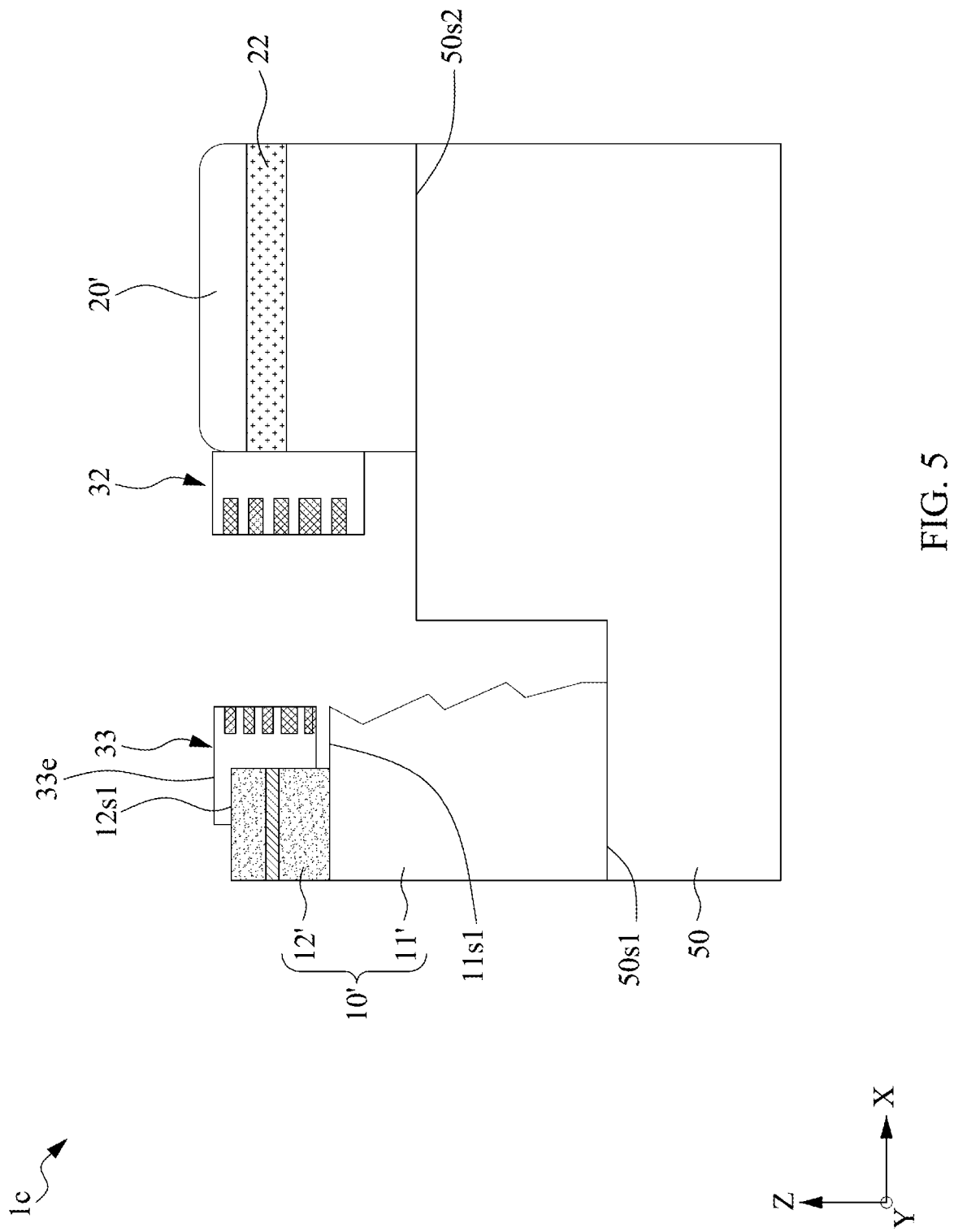
FIG. 5 illustrates a cross-sectional view of an example of an optoelectronic package according to some embodiments of the present disclosure.

FIG. 5 illustrates a cross-sectional view of an example of an optoelectronic package 1c according to some embodiments of the present disclosure. The optoelectronic package 1c is similar to the optoelectronic package 1b as shown in FIG. 4, and the differences therebetween are described below.

In some embodiments, the optoelectronic package 1c may include a structure portion 33 in place of the structure portion 31. In some embodiments, the structure portion 33 may have an L-shaped profile or other suitable profile. In some embodiments, the structure portion 33 may be spaced apart from the surface 11s1 of the substrate 11', which may prevent an undesired optical signal entering the substrate 11' due to the difference of refractive index between the substrate 11' and the structure portion 33. In some embodiments, the structure portion 33 may include an extension portion 33e hanging over or disposed over a surface 12s1 (or an upper surface) of the optical transmission portion 12', which thereby reduces delamination between the structure portion 33 and the photonic component 10'.

Figure 6:
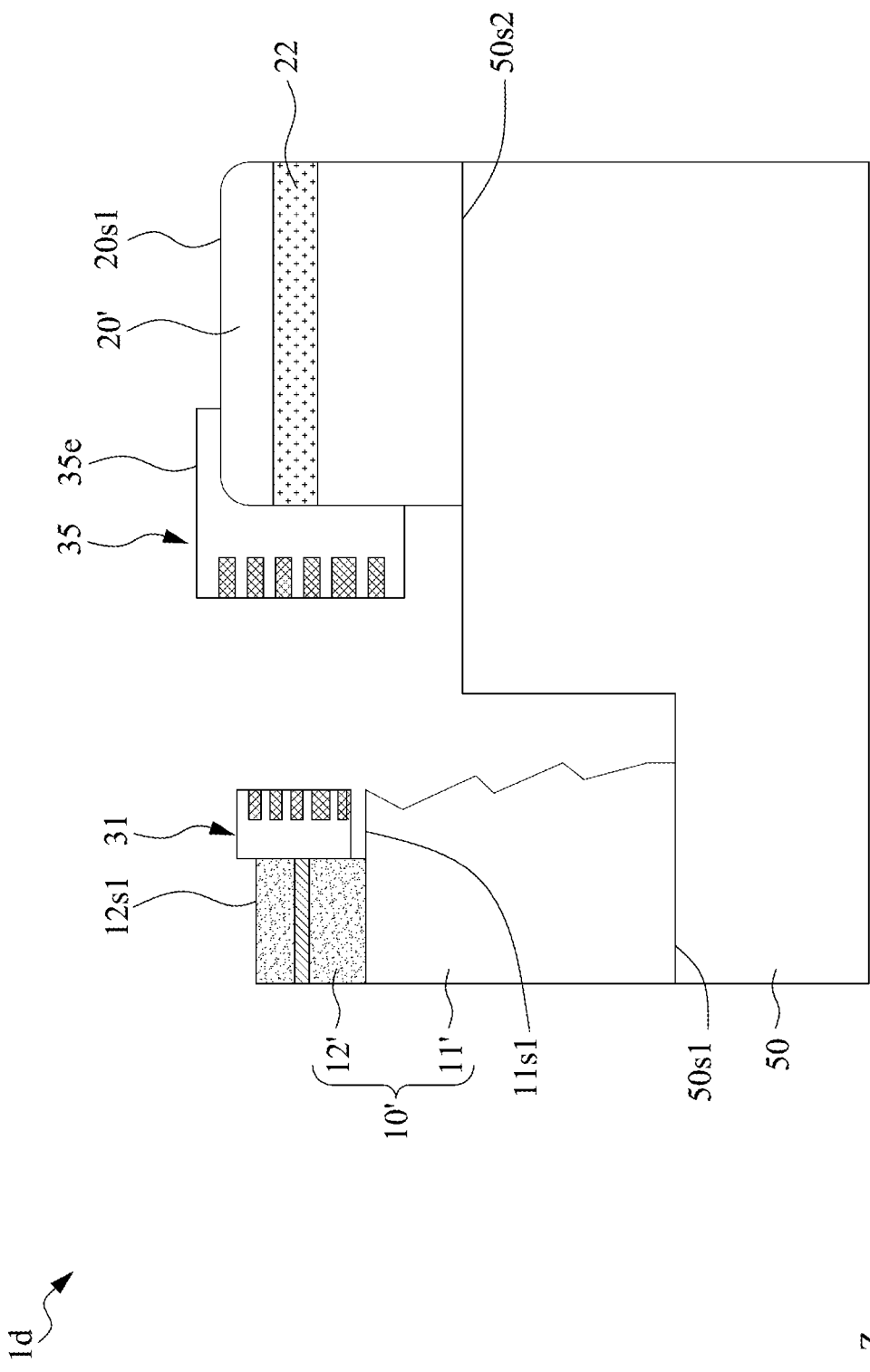
FIG. 6 illustrates a cross-sectional view of an example of an optoelectronic package according to some embodiments of the present disclosure.

FIG. 6 illustrates a cross-sectional view of an example of an optoelectronic package 1d according to some embodiments of the present disclosure. The optoelectronic package 1d is similar to the optoelectronic package 1b as shown in FIG. 4, and the differences therebetween are described below.

In some embodiments, the optoelectronic package 1d may include a structure portion replacing the structure portion 32 as shown in FIG. 4. In some embodiments, the structure portion 35 may have an L-shaped profile or other suitable profiles. In some embodiments, the structure portion 35 may have an extension portion 35e hanging over or disposed over a surface (or an upper surface) 20s1 of the optical component 20', which thereby reduces delamination between the structure portion 35 and the optical component 20'.

Figure 7:
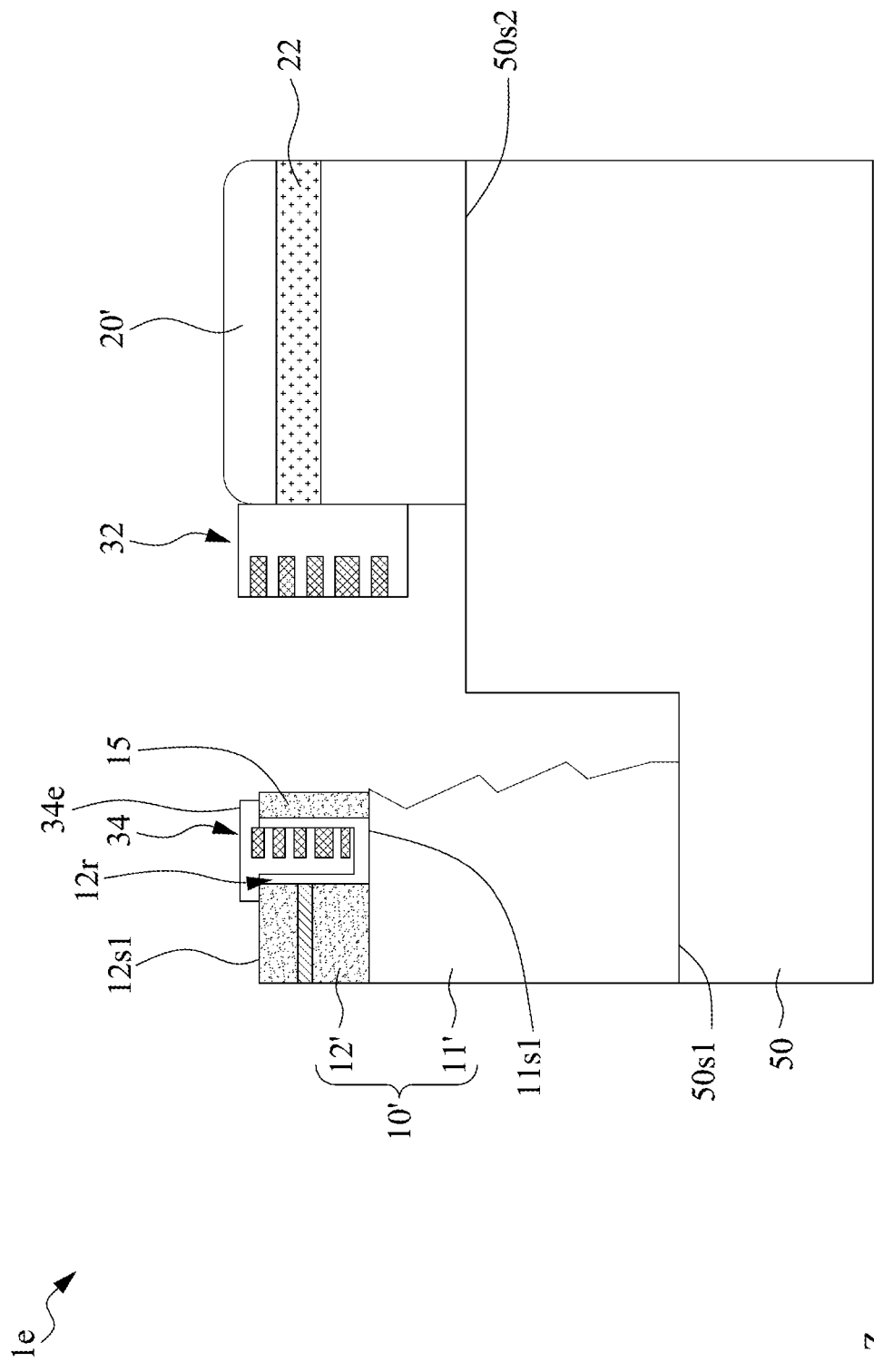
FIG. 7 illustrates a cross-sectional view of an example of an optoelectronic package according to some embodiments of the present disclosure.

FIG. 7 illustrates a cross-sectional view of an example of an optoelectronic package 1e according to some embodiments of the present disclosure. The optoelectronic package 1e is similar to the optoelectronic package 1b as shown in FIG. 4, and the differences therebetween are described below.

In some embodiments, the optoelectronic package 1e may include a supporter 15 and a structure portion 34. In some embodiments, the supporter 15 may be disposed on the surface 11s1 of the substrate 11'. The supporter 15 may include or be composed of oxide, such as silicon oxide ($SiO_2$), yttrium oxide ($Y_2O_3$), aluminum oxide or other suitable materials. The supporter 15 and the optical transmission portion 12' may define a recess 12r therebetween. In some embodiments, the structure portion 34 may include an extension portion 34e hanging over or disposed over the surface 12s1 of the optical transmission portion 12' and an upper surface (not annotated in the figures) of the supporter 15. In some embodiments, a portion of the structure portion 34 may be disposed between the supporter 15 and the optical transmission portion 12'. In some embodiments, a portion of the structure portion 34 may be inserted into the recess 12r, which thereby prevents delamination between the structure portion 34 and the photonic component 10'.

Figure 8A:
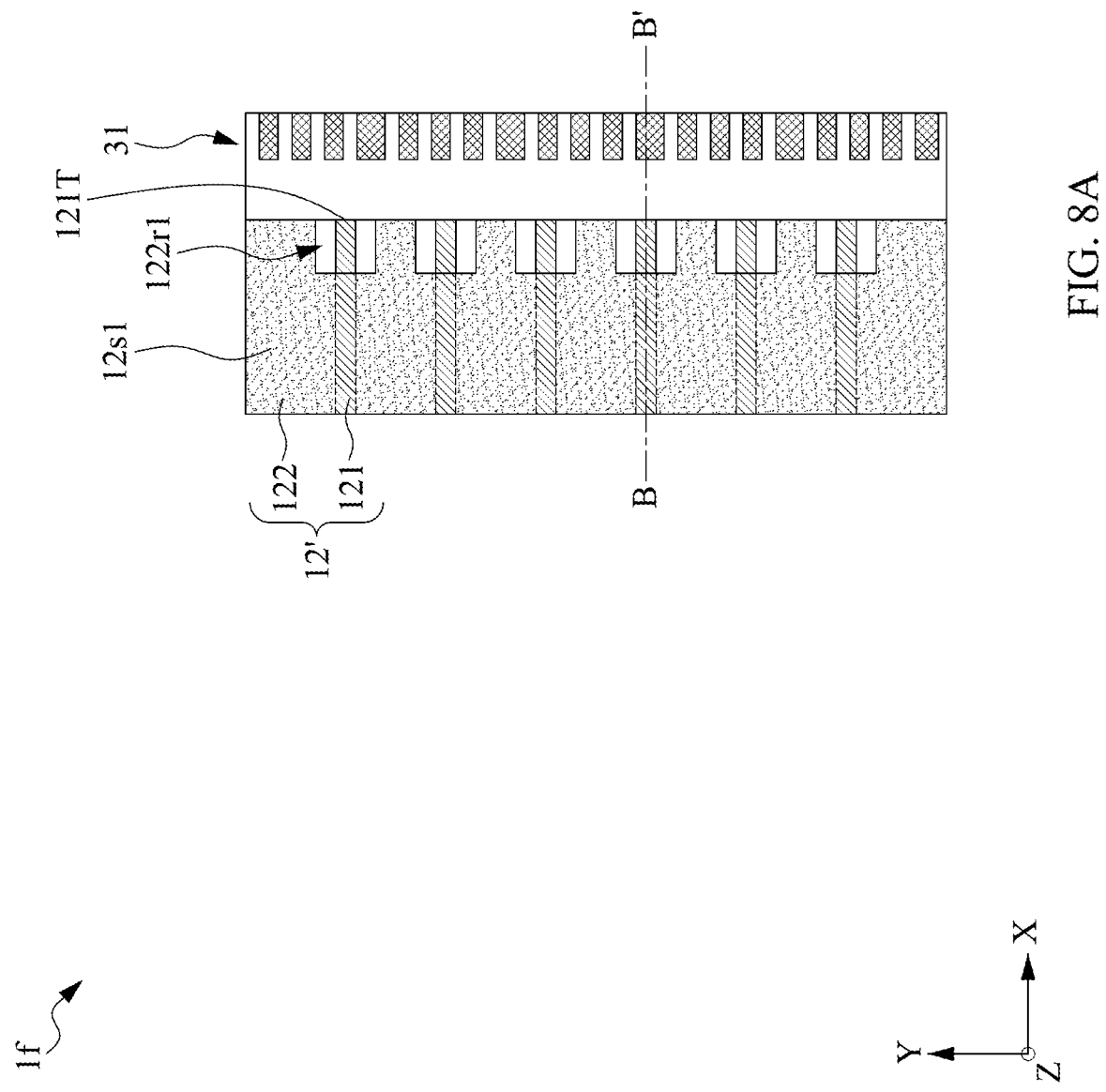
FIG. 8A illustrates a top view of an example of an optoelectronic package according to some embodiments of the present disclosure.
Figure 8B:
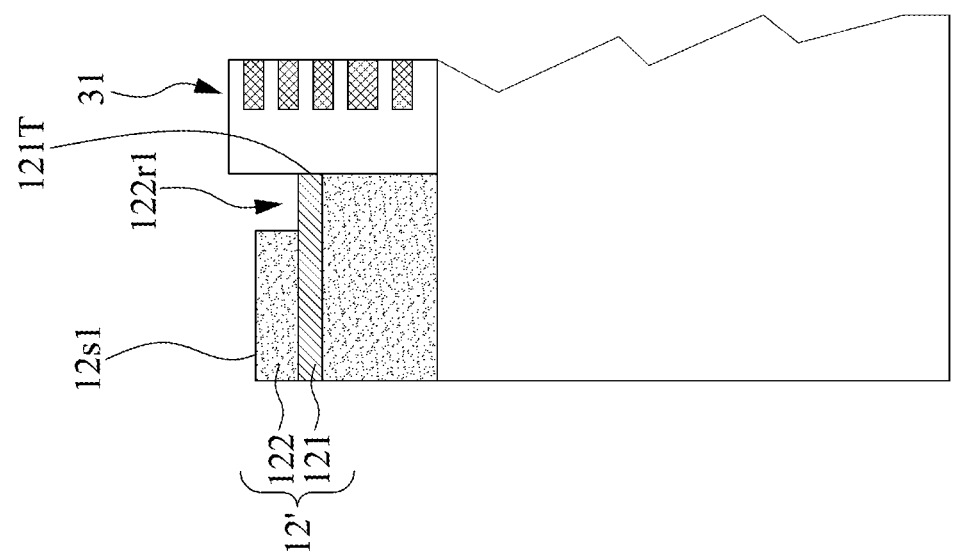
FIG. 8B illustrates a cross-sectional view along line B-B' of the optoelectronic package as shown in FIG. 8A.

FIG. 8A illustrates a top view of an example of an optoelectronic package 1f according to some embodiments of the present disclosure, and FIG. 8B illustrates a cross-sectional view along line B-B' of the optoelectronic package 1f as shown in FIG. 8A. The optoelectronic package 1f is similar to the optoelectronic package 1b as shown in FIG. 4, and the differences therebetween are described below.

In some embodiments, the optical transmission portion 12' may define a plurality of recesses 122r1. The recess 122r1 may be recessed from the surface 12s1 of the optical transmission portion 12. The recess 122r1 may be defined by the cladding layer 122 and the structure portion 31. As shown in FIG. 8A, the recesses 122r1 may be spaced part from each other by the cladding layer 122. As shown in FIG. 8B, a portion of the signal channel 121 (i.e., terminal 121T) may be exposed from the recess 122r1. In some embodiments, a portion of the signal channel 121 (i.e., terminal 121T) may be exposed to air. The difference in the refractive index between the signal channel 121 and air may be greater than that between the signal channel 121 and the cladding layer 122, which thereby enhances the efficiency of signal transmission.

Figure 9:
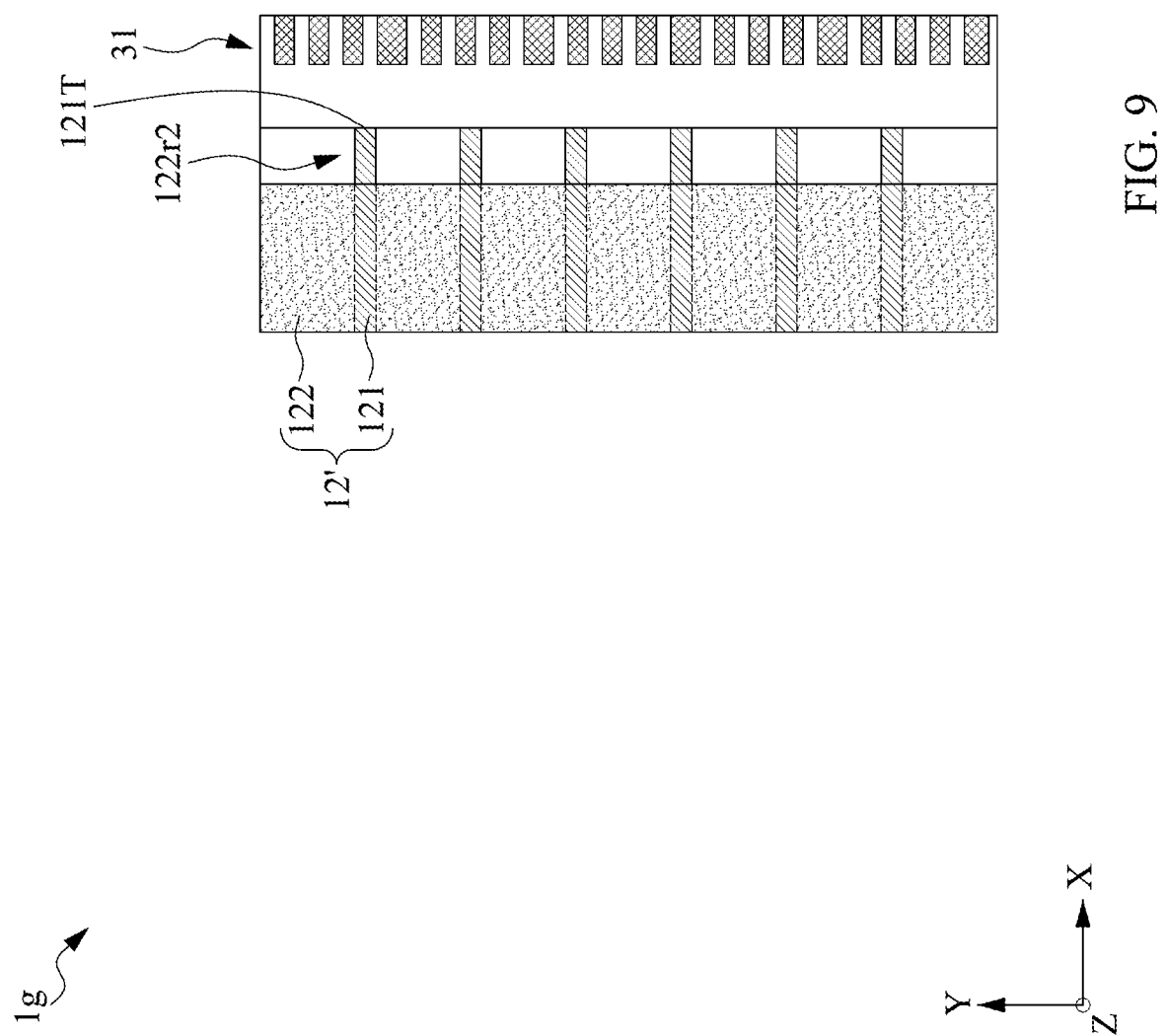
FIG. 9 illustrates a top view of an example of an optoelectronic package according to some embodiments of the present disclosure.

FIG. 9 illustrates a top view of an example of an optoelectronic package 1g according to some embodiments of the present disclosure. The optoelectronic package 1g is similar to the optoelectronic package 1f as shown in FIG. 8B, and the differences therebetween are described below.

In some embodiments, the optical transmission portion 12' may define a recess 122r2. The recess 122r1 may be defined by the cladding layer 122 and the structure portion 31. In some embodiments, the recess 122r2 may continuously extend along the Y-axis, and expose a plurality of the terminals 121T. In some embodiments, a portion of each signal channel 121 (i.e., terminal 121T) may be exposed from the recess 122r2. The difference in the refractive index between the signal channel 121 and air may be greater than that between the signal channel 121 and the cladding layer 122, which thereby enhances the efficiency of signal transmission.

Figure 10A:
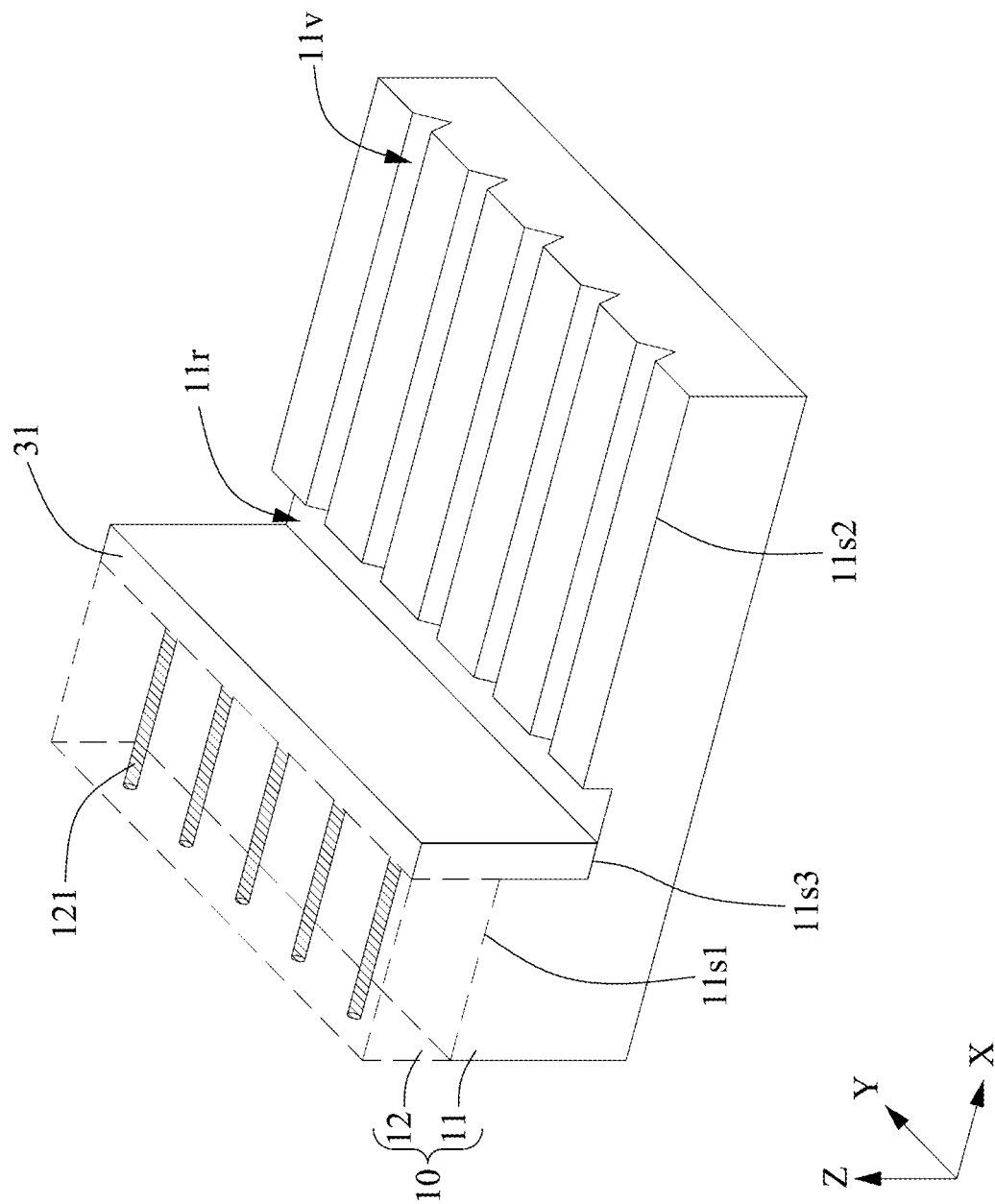
FIG. 10A, FIG. 10B, and FIG. 10C illustrate various stages of an example of a method for manufacturing an optoelectronic package according to some embodiments of the present disclosure.
Figure 10B:
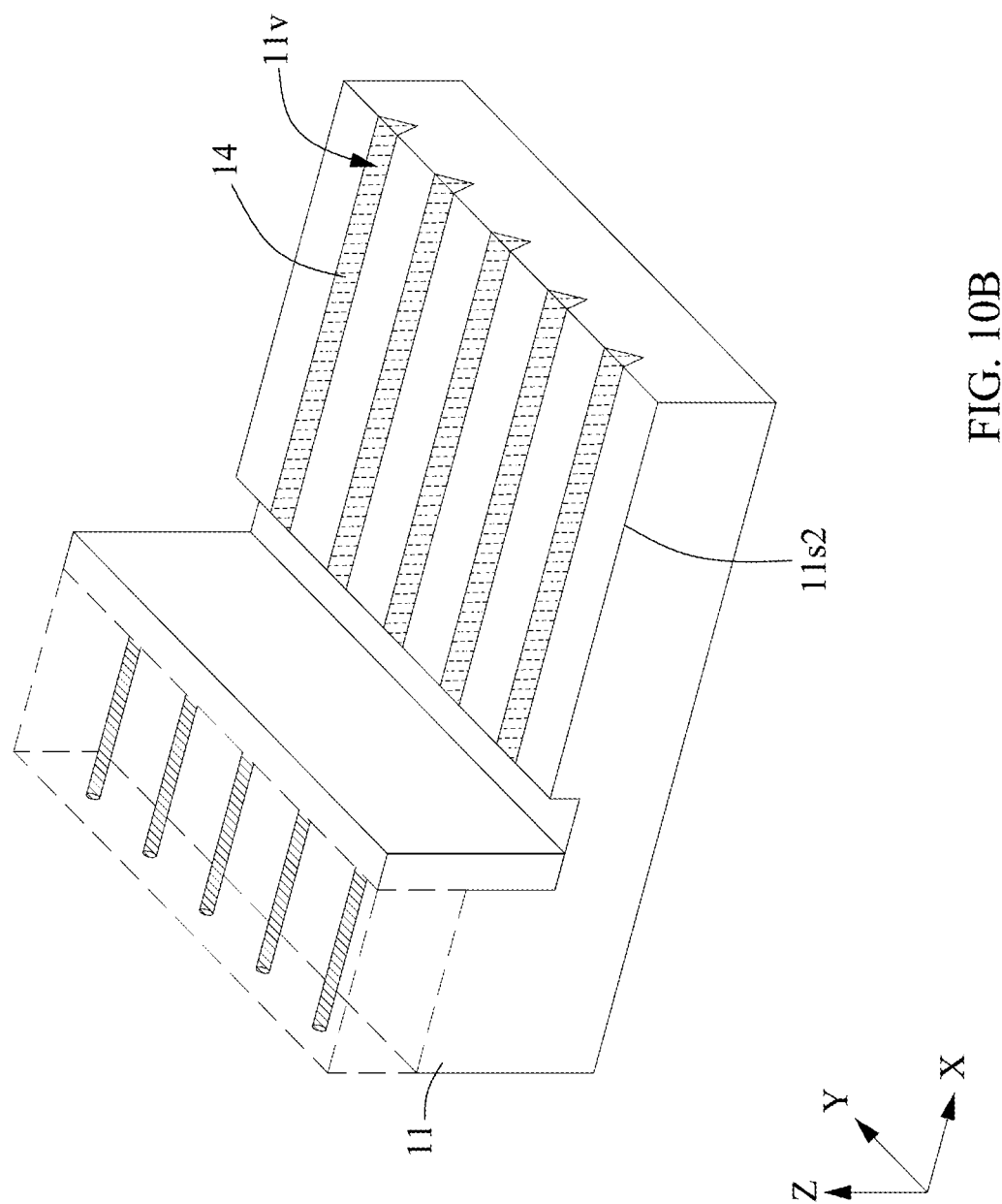
Figure 10C:
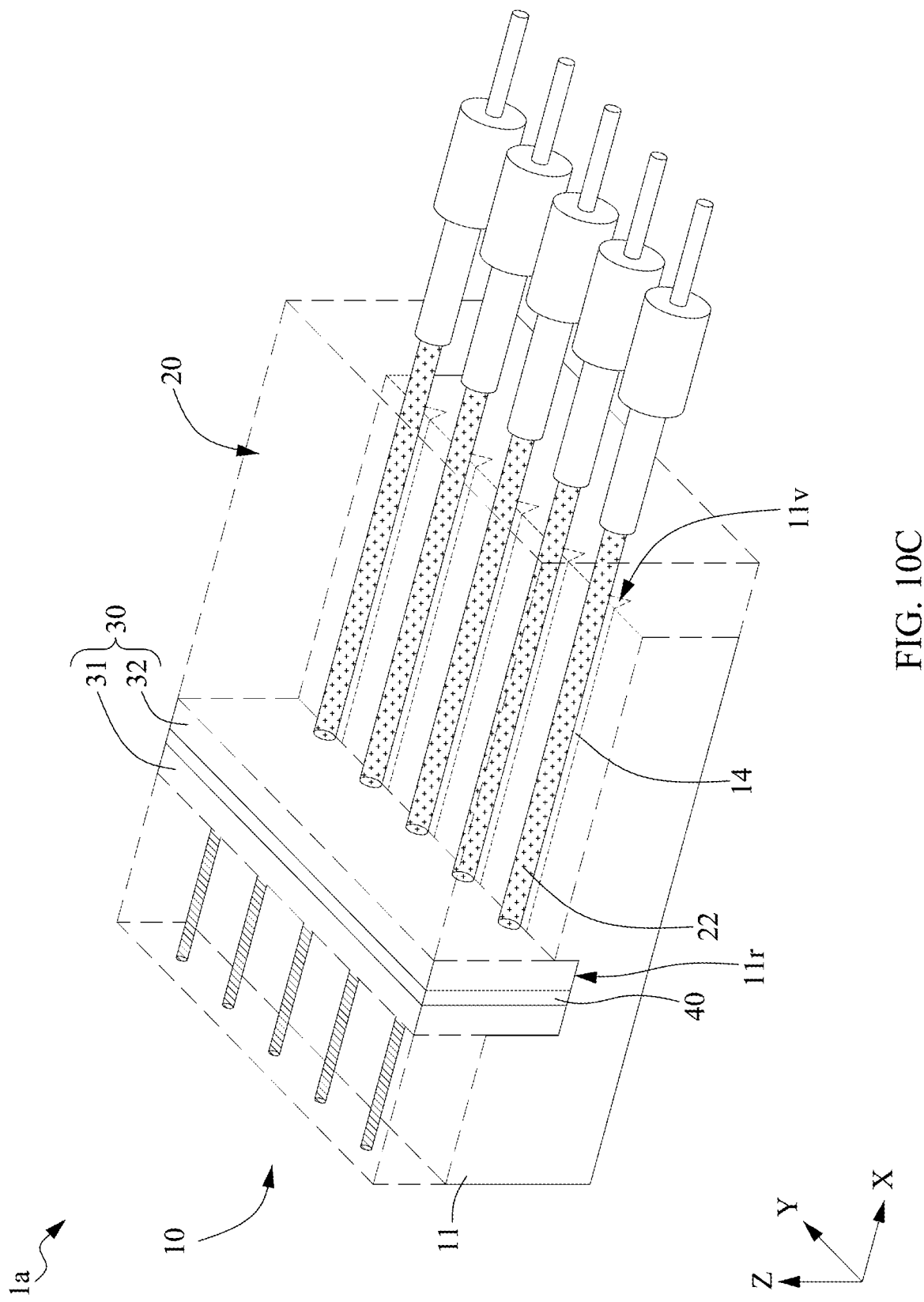

FIGS. 10A, 10B, and 10C illustrate various stages of an example of a method for manufacturing an optoelectronic package according to some embodiments of the present disclosure. In some embodiments, the optoelectronic package 1a may be manufactured through the operations described with respect to FIG. 10A, FIG. 10B and FIG. 10C.

Referring to FIG. 10A, a photonic component 10 may be provided. The photonic component 10 may include a substrate 11 and an optical transmission portion 12. In some embodiments, the substrate 10 may be etched to define a surface 11s1, a surface 11s2, and a surface 11s3 with different horizontal levels. The optical transmission portion 12 may be formed on the surface 11s1 of the substrate 11. A recess 11r may be defined by the surface 11s3, a lateral surface connecting the surface 11s1 and 11s3 and a lateral surface connecting the surface 11s2 and 11s3, and the surface 11s3 may be a bottom of the recess 11r. A plurality of grooves 11v may be recessed from a surface 11s2 of the substrate 11, each of which may be aligned to a corresponding terminal of the signal channels 121. A structure portion 31 of a connection element may be formed on or over the surface 11s3 of the substrate 11. The structure portion 31 of a connection element may be partially disposed in the recess 11r.

Referring to FIG. 10B, a glue layer 14 may be filled into the groove 11v.

Referring to FIG. 10C, an optical component 20 may be disposed on and attached to the substrate 11 of the photonic component 10. The signal channels 22 of the optical component may be disposed on or over the glue layer 14 and the terminal of the signal channels may be aligned with the corresponding groove 11v along the Z-axis. A structure portion 32 of a connection element may be disposed over the recess 11r and attached to the structure portion 31 through an optical adhesive 40, which thereby produces a connection element 30. In some embodiments, the structure portion 32 may be attached to the optical component 20 in advance to form an integrated structure, a transfer head (not shown) may pick up the integrated structure and then bond the integrated structure to the substrate 11 through the glue layer 14. Next, the glue layer 14 may be cured by, for example, an ultraviolet light. As a result, an optical package, such as the optical package 1a, may be produced.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. Such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optoelectronic package, comprising:
a photonic integrated circuit (PIC) comprising an optical transmission portion including a plurality of first terminals exposed from a first surface of the PIC, wherein the PIC is configured to make a conversion between optical signals and electric signals;
an optical component facing the first surface of the PIC, wherein the optical component is configured to transmit the optical signals to or receive the optical signals from the optical transmission portion; and
a connection element disposed between the first surface of the PIC and the optical component, wherein the connection element is configured to reshape the optical signals, the connection element comprises a first structure portion supported by the optical transmission portion of the PIC and a second structure portion supported by the optical component, and the first structure portion is spaced apart from the second structure portion, and wherein the first structure portion comprises an extension portion disposed over the optical transmission portion of the PIC.

2. The optoelectronic package of claim 1, wherein the second structure portion comprises an extension portion disposed over the optical component.

3. The optoelectronic package of claim 1, further comprising:
a supporter, wherein the supporter and the optical transmission portion define a recess, and the first structure portion comprises an extension portion hanging over the optical transmission portion and the supporter, and wherein a portion of the first structure portion is inserted into the recess and spaced apart from the supporter.

4. An optoelectronic package, comprising:
a photonic integrated circuit (PIC) comprising a waveguide;
an optical component comprising a fiber and configured to transmit optical signals and optically coupled with the PIC, wherein the waveguide is free from overlapping the fiber along a substantially vertical direction, and a first terminal of the waveguide is misaligned with a second terminal of the fiber along a substantially horizontal direction; and
a connection element located between the PIC and the optical component, wherein the connection element comprises a metasurface structure configured to guide the optical signals to be transceived between the first terminal and the second terminal.

5. The optoelectronic package of claim 4, wherein the PIC comprises a substrate and an optical transmission portion over the substrate, the optical transmission portion comprises the waveguide and a cladding layer encapsulating the waveguide, and a refractive index of the cladding layer is less than a refractive index of the waveguide.

6. The optoelectronic package of claim 4, wherein a diameter of the fiber is greater than a diameter of the waveguide.

7. The optoelectronic package of claim 5, wherein the substrate comprises a groove accommodating the optical component, and the connection element is free from overlapping the groove along the substantially vertical direction.

8. The optoelectronic package of claim 5, wherein the cladding layer has a recess exposing at least a portion of an upper surface of the waveguide from a top view.

9. The optoelectronic package of claim 8, wherein the recess of the substrate extends from a first outer lateral surface to a second outer lateral surface, opposite to the first outer lateral surface, of the PIC, and the first outer lateral surface is substantially parallel to an extension direction of the waveguide from the top view.

10. An optoelectronic package, comprising:
a photonic integrated circuit (PIC) comprising an optical transmission portion including a plurality of first terminals exposed from a first surface of the PIC, wherein the PIC is configured to make a conversion between optical signals and electric signals;
an optical component facing the first surface of the PIC, wherein the optical component is configured to transmit the optical signals to or receive the optical signals from the optical transmission portion; and
a connection element disposed between the first surface of the PIC and the optical component, wherein the connection element is configured to reshape the optical signals, the connection element comprises a first structure portion supported by the optical transmission portion of the PIC and a second structure portion supported by the optical component, and the first structure portion is spaced apart from the second structure portion, and wherein the PIC comprises a substrate, the optical transmission portion is disposed over an upper surface of the substrate, and the first structure portion is spaced apart from the upper surface of the substrate.

* * * * *